May 31, 1949.   A. PANDOLFI   2,471,650
FUSIBLE RING AND METHOD OF MAKING SAME

Filed Oct. 19, 1945   2 Sheets-Sheet 1

INVENTOR
ALBERT PANDOLFI
BY
Wheeler, Wheeler & Wheeler
ATTORNEYS

May 31, 1949.  A. PANDOLFI  2,471,650
FUSIBLE RING AND METHOD OF MAKING SAME
Filed Oct. 19, 1945  2 Sheets-Sheet 2

INVENTOR
ALBERT PANDOLFI
BY
Wheeler, Wheeler & Wheeler
ATTORNEYS

Patented May 31, 1949

2,471,650

UNITED STATES PATENT OFFICE 2,471,650

FUSIBLE RING AND METHOD OF MAKING SAME

Albert Pandolfi, Milwaukee, Wis., assignor to Donald F. Lucas, Howard A. Milhaupt, and Albert Pandolfi, copartners, doing business under the name and firm style of Lucas-Milhaupt Engineering Sales Co., Cudahy, Wis.

Application October 19, 1945, Serial No. 623,297

4 Claims. (Cl. 113—110)

This invention relates to an improvement in fusible rings of a composition suitable for supplying the material required either in welding, brazing or soldering operations and also to a method of producing such rings.

The rings are produced in the form of a helix or coil with frangible or breakable sections connecting adjacent convolutions of the coil. They are packaged, shipped and stored as coil. Entanglement is avoided. At the time and place of use individual convolutions may readily and easily be broken off to provide separate, split fusible rings.

Heretofore, the material supplied to welded or brazed joints in many applications of these arts has been provided in the form of a split ring. These rings have either been wound as individual rings and cut or split with a shear blade or have been wound to size on a mandrel and as a helix coil, the convolutions of which are then cut off by means of an abrasive cut-off wheel so as to separate completely the helix or coil into individual or separate rings. In either event the individual or separate rings are packaged so that at the point of use, the welder or brazer will have available the individual rings needed to supply the welding or brazing material between the structures to be united or joined. It was found that with this practice, the rings although packaged, became entangled and the entanglement of the rings slows up the efforts of the welder or brazer and reduces his production as it is necessary to disentangle each ring before it could be applied to the structure to be brazed or welded.

The present invention proposes a solution of this problem in that while the rings are wound to size and as a helical coil they are further prepared or structurally modified in a special way for their practical use. After the wire is wound on the mandrel, the present invention proposes to use an abrasive wheel or an abrasive cut-off wheel or saw to notch a portion of each coil or convolution. This may be conveniently done along an axis parallel to the axis of the mandrel. The essential is, however, that each coil or convolution be notched or weakened and this to such an extent that a zone or section between adjacent convolutions is made frangible or breakable in character so that the welder in handling the wire, which he must use, may, with his hands, easily break convolution from convolution. In this way while individual rings are readily available at the point and time of use, entanglement is avoided and production facilitated and increased. Of course, any suitable welding or brazing material may be employed in pursuing the present invention, since the object of it is to facilitate the handling and application of such material.

As a further improvement, each convolution may be provided with an additional notch preferably at a point diametrically opposite the frangible or breakable zone between adjacent convolutions, these additional notches or hinge-like sections or zones being provided by the notches allowing the meeting ends of each split ring to be spread to facilitate the assembly or encirclement by the individual rings with the structure to be joined. In other words the notches first described facilitate the breaking off of the convolutions of the helix or coil to provide individual rings at the point of use while the second notches facilitate assembly of the individual rings with the parts to be welded or brazed.

These objects of the invention and other ancillary advantages are attained by the mechanism, construction, and arrangement illustrated in the accompanying drawings forming part hereof, in which.

Figure 1:
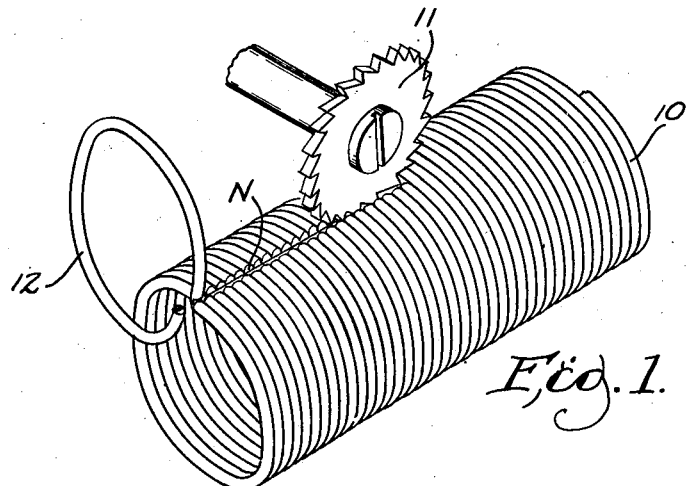
Fig. 1 is a perspective view illustrating the manner in which the helix or coil is notched to provide a frangible or breakable zone and also illustrating the way in which any coil or convolution may be detached.

Referring to the drawings and more particularly to Figures 1 to 4 inclusive, the numeral 10 designates a coil of wire of suitable composition, which has been wound to size on a mandrel (not shown). The coil 10 is notched along a line parallel to the axis of the coil as indicated at N in Figure 1. Figure 1 shows only a portion of the coil 10 notched but it is to be understood that it is notched as described from end to end. The notching or partial severance of adjacent convolutions may be accomplished in any suitable way and while the coil is still on the mandrel (not shown). As illustrated in Figure 1, a steel splitting saw 11 may be employed for this purpose. Preferably, however, an abrasive wheel designated at 15 (see Figure 5) is utilized for this purpose.

The notching operation does not completely sever the convolutions of the coil but does provide thinned or weakened connections between adjacent convolutions. In other words, there is a frangible or breakable zone or section between adjacent convolutions of the coil.

The construction is such that the coils may be packaged, stored and shipped without entanglement and yet at the place and time of use, the end convolution of the coil may be successively and readily and easily separated from the coil by merely grasping and twisting. Figure 1 illustrates how an end convolution 12 is twisted from the coil to provide a separate or individual split ring as illustrated in Figure 2.

Figures 2, 3:
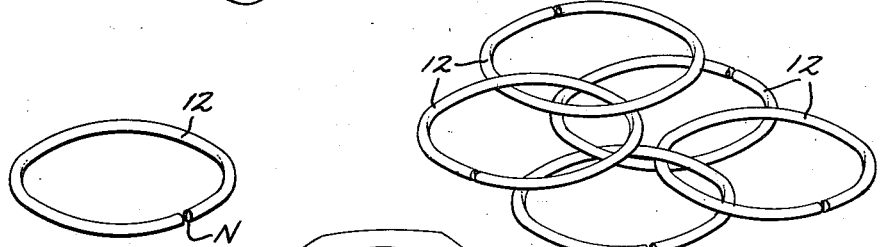
Fig. 2 is a perspective view of a detached convolution or ring.
Fig. 3 is a perspective view showing how separate or individual rings become entangled when packaged.

Figure 3 illustrates how completely separate rings become entangled when packaged as such. Obviously, the welder must take the time and expend the effort to disentangle the rings with the consequent slowing up of his work and reduced production.

Figure 4:
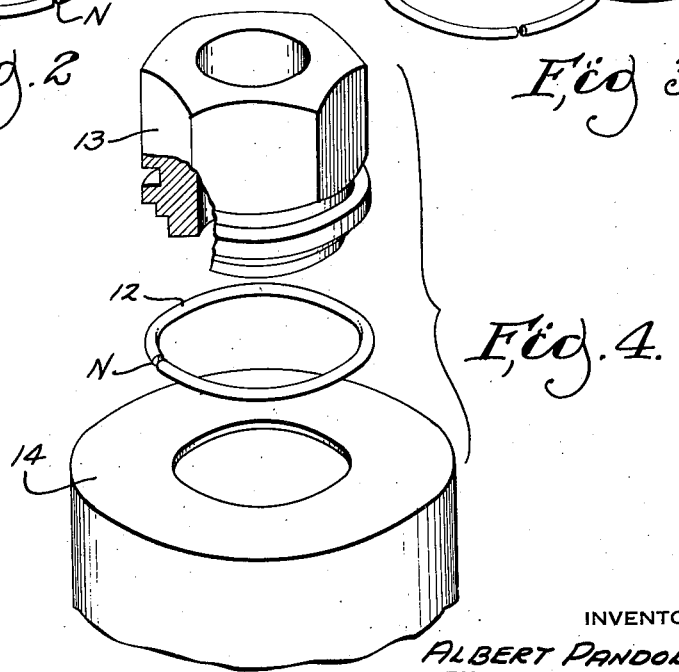
Fig. 4 is a group view in perspective showing the manner in which one of the detached coils is employed for assembling a nut to the head of a structural body such as a cylinder.

Figure 4 shows how a separated convolution 12 providing a split ring is to be utilized as the welding material between a nut 13 and a cylindrical body 14.

With such a construction the coils remain intact as coils, when packaged, stored and shipped and will not become entangled and yet at the time and place of use separate or individual split rings are readily, quickly and conveniently available. Time and effort are saved and production is increased.

Figure 5:
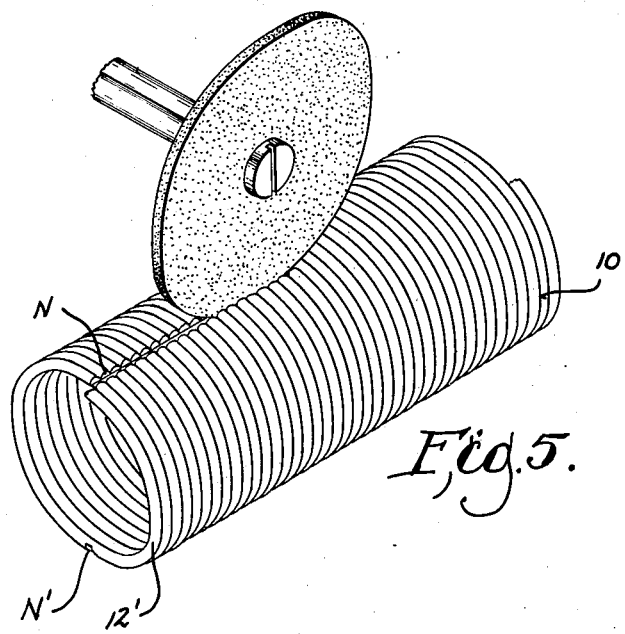
Fig. 5 is a perspective view similar to Figure 1 but showing how a helix or coil previously notched to provide a frangible or breakable zone or section may be further notched to provide a bendable or hinge-like zone or section at a point angularly spaced from the frangible or breakable zone.
Figure 6:
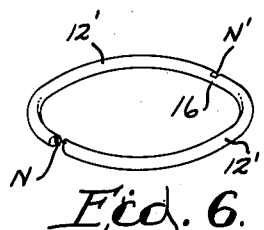
Fig. 6 is a detail perspective view of a ring or convolution detached from the helix or coil of Figure 5.
Figure 7:
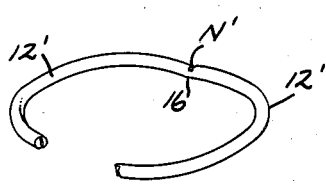
Fig. 7 is another detail perspective view of a ring or convolution detached from the coil and spread for assembly with the structure to be welded or brazed; and, Fig. 8 is a perspective view illustrating how a detached and spread ring is assembled with the structure to be welded or brazed.
Figure 8:
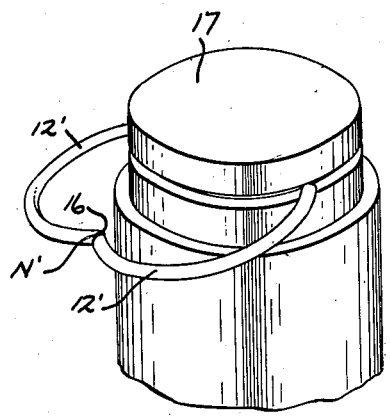

In the form of the invention shown in Figures 5 to 8 inclusive, a coil 10 is wound to size on a mandrel (not shown) just as it is in the other or basic form of the invention. Likewise, the coil 10 is notched or partially severed along a line parallel to its axis as indicated at N. Figure 5 illustrates an abrasive wheel for performing the notching operation. The notch N, as before, provides a frangible or breakable zone or section between adjacent convolutions of the coil so that as required an end convolution designated at 12' may be twisted and broken from the coil 10 in the manner previously described to provide a separate or individual, non-entangled fusible ring at the time and place of use.

In the embodiment of the invention shown in Figures 5 to 8 inclusive the coil 10 is slightly notched as at $N^1$ along a line parallel to the axis of the coil at a point angularly spaced from and usually diametrically opposite the notch N. The notches $N^1$ are so dimensioned and proportioned that when each convolution $12^1$ is twisted and broken from the coil 10 it not only provides a separate non-entangled split fusible ring, but also one having a bendable or hinge-like connection 16 between the two halves of each separate split ring. These bendable or hinge-like connections 16 enable the separate split rings $12^1$ to be readily and easily spread to facilitate their assembly with a part 17 to be welded, brazed or otherwise joined to some companion part not shown. After assembly the split ring $12^1$ may be readily pressed back into circular shape and into a snug fit with the part 17 which it embraces.

The invention is thought to involve not only the article of manufacture characterized by the novel features and advantages described but also a novel method.

The method comprises basically size winding on a mandrel a wire of suitable composition into the form of a coil or helix, notching or cutting away the convolutions of the coil along a line parallel to its axis to such an extent that each convolution has a frangible or breakable zone or section whereby the coils may be packaged, stored and shipped intact without becoming entangled and individual convolutions may be readily and easily broken from the coil along a definite and clear cut line of severance at the time and place of use to provide separate and individual unentangled split rings.

As a refinement and improvement on this basic method, the present invention further proposes notching or cutting away the convolutions of the coil also along a line parallel to its axis but a point angularly spaced, preferably diametrically opposite, from the frangible or breakable sections between adjacent convolutions to provide bendable or hinge-like connections between the two halves of each separated convolution or separated split ring so that the separate split ring may be spread to facilitate its assembly with a part to be welded or otherwise joined to a companion part and after assembly pressed into snug fit with the part with which it has been assembled.

While I have shown and described several constructions in which the article of manufacture embodying my present invention may be advantageously embodied and have disclosed one practical method and the refining thereof for producing coils and rings embodying the article of manufacture, it is to be understood that various changes in the size, shape and arrangement of the parts constituting the article of manufacture and variations in the steps of the method and in the sequence may be made without departing from the spirit of the invention or the scope of the subjoined claims.

What I claim is:

1. As an article of manufacture, a substantially helical coil of material adapted to be fused into joints of parts to be united and also adapted to be packaged without tending to become entangled, said coil having a channel extending from end to end of said coil and penetrating successive convolutions, whereby its convolutions are individually notched to provide breakable zones so that individual split rings may be readily separated from the coil at the point and time of use.

2. As an article of manufacture, a coil of material adapted to be fused into joints of parts to be united and also adapted to be packaged without tending to become entangled and having its convolutions notched at substantially corresponding points throughout the length of the coil to provide breakable zones so that individual split rings of substantially uniform size may be readily separated from the coil at the point and time of use, said coil also having each convolution formed with a bendable, hinge-like zone at a point angularly spaced from its splits so that each separated ring may be spread to facilitate its application to the structures to be joined.

3. The herein described method of producing fusible rings which comprise size winding a wire of suitable composition on a mandrel into the form of a coil, and notching the convolutions of the coil in a line from end to end of a predetermined series of convolutions thereof to such an extent that each such convolution has a frangible or breakable section connecting it to the next adjacent coil whereby the coils may be packaged, stored or shipped wthout becoming entangled and individual convolutions may be readily broken from the coil at the time and place of use to provide separate unentangled split rings.

4. The herein described method of producing fusible rings which comprise size winding a wire of suitable composition on a mandrel into the form of a coil, and notching the convolutions of the coil along a line parallel to its axis to such an extent that each convolution has a frangible or breakable section connecting it to the next adjacent coil whereby the coils may be packaged, stored or shipped without becoming entangled and individual convolutions may be readily broken from the coil at the time and place of use to provide separate unentangled split rings and also deforming the convolutions of the coil at points angularly spaced from the frangible or breakable sections thereof to provide bendable or hinge-like zones to provide for spreading of each detached ring or convolution to facilitate its assembly with a structure to be welded or brazed.

ALBERT PANDOLFI.

REFERENCES CITED

The following references are of record in the file of this patent:

UNITED STATES PATENTS

| Number | Name | Date |
|---|---|---|
| 239,111 | O'Meara | Mar. 22, 1881 |
| 421,004 | Kimball | Feb. 11, 1890 |
| 581,532 | Booth | Apr. 27, 1897 |
| 595,091 | Bennett | Dec. 7, 1897 |
| 1,162,823 | Tolman | Dec. 7, 1915 |
| 1,615,094 | McFarland | Jan. 18, 1927 |
| 1,675,299 | Dawson | June 26, 1928 |
| 1,801,363 | Mueller | Apr. 21, 1931 |
| 1,875,905 | Youngken | Sept. 6, 1932 |
| 2,047,264 | Halligan | July 14, 1936 |
| 2,128,437 | Stenwall | Aug. 30, 1938 |
| 2,247,499 | Hutchinson | July 1, 1941 |

FOREIGN PATENTS

| Number | Country | Date |
|---|---|---|
| 194,363 | Great Britain | 1923 |